(12) United States Patent
Oberg et al.

(10) Patent No.: US 7,965,597 B1
(45) Date of Patent: Jun. 21, 2011

(54) METHOD AND APPARATUS FOR RECORDING

(75) Inventors: Mats Oberg, Cupertino, CA (US); Zachary Keirn, Loveland, CO (US)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 12/832,601

(22) Filed: Jul. 8, 2010

Related U.S. Application Data

(63) Continuation of application No. 11/925,258, filed on Oct. 26, 2007, now Pat. No. 7,817,512.

(60) Provisional application No. 60/863,487, filed on Oct. 30, 2006.

(51) Int. Cl.
*G11B 5/09* (2006.01)

(52) U.S. Cl. ............... 369/47.28; 369/47.48; 369/59.19; 369/59.2; 369/44.13

(58) Field of Classification Search ........................ None
See application file for complete search history.

(56) References Cited

U.S. PATENT DOCUMENTS

| 6,345,018 | B1 | 2/2002 | Maegawa et al. |
| 2007/0097825 | A1 | 5/2007 | Holstine |

OTHER PUBLICATIONS

Jun. 23, 2010 Notice of Allowance, issued in U.S. Appl. No. 11/925,258.

*Primary Examiner* — Muhammad N Edun

(57) ABSTRACT

Aspects of the disclosure provide a method for recording. The method includes receiving a tracking signal corresponding to a recording track on a storage medium, phase-locking an internal signal to the tracking signal by reducing a phase error generated based on the internal signal and the tracking signal, generating a phase bias, combining the phase bias into the phase error to phase-shift the internal signal from the tracking signal, and recording on the recording track based on the internal signal.

20 Claims, 5 Drawing Sheets

METHOD AND APPARATUS FOR RECORDING

INCORPORATION BY REFERENCE

This application is a continuation of U.S. patent application Ser. No. 11/925,258 filed Oct. 26, 2007, which claims the benefit of U.S. Provisional Application No. 60/863,487, "METHOD AND APPARATUS TO CORRECT WOBBLE PHASE SLIP IN OPTICAL RECORDERS" filed Oct. 30, 2006. The disclosures of the prior applications are incorporated herein by reference in their entirety.

BACKGROUND

Generally, data can be stored on a recording layer of an optical disc by forming either data pits or data marks on tracks arranged in an interleaved spiral or concentric circles. A path of the track can be continuously modulated to deviate from its centerline in the radial direction. Such modulation about a centerline is generally referred to as wobble. Wobble can be utilized to store information, such as address and location, via various techniques. Techniques include pre-pit, phase modulation and frequency modulation.

The wobble can be converted into wobble signal by an optical apparatus. The wobble signal can be a sinusoidal modulated voltage signal that can be used in an optical disc recording system to provide the address and location information for recording.

SUMMARY

The present disclosure can provide a method and an apparatus to correct wobble phase slip in an optical disc recording apparatus. Such phase slip can occur during, for example, recording.

Aspects of the disclosure can be directed to a method and an apparatus of correcting a phase slip detected in a recording apparatus. The method of correcting a phase slip can include receiving a wobble signal of a first frequency, sampling the wobble signal to generate a sampled wobble signal, where the wobble signal is sampled at a second frequency that corresponds to a frequency of a sampling signal, comparing a phase of the sampled wobble signal with a phase of a controlled signal to generate a phase error, modifying the phase error by adding a phase bias, and adjusting the second frequency based on the modified phase error to reduce a magnitude of the modified phase error.

The present disclosure can also provide a method of correcting the phase slip, where the wobble signal is a sinusoidal signal and coded with information. The information can be coded using at least one of phase modulation, frequency modulation and pre-pitting. The method can also include decoding information in the wobble signal, and detecting a phase slip based on the information decoded. Additionally, the method can also include determining a number of wobble signal cycles required to correct the detected phase slip based on the decoded information. According to the present disclosure, adding the phase bias can also include changing a magnitude of the phase bias to a target magnitude at a slow average rate.

Aspects of the present disclosure can provide a method of correcting the phase slip, where comparing the phase of the sampled wobble signal with the phase of the controlled signal to generate the phase error can include generating a sine signal having the first frequency, multiplying the sampled wobble signal with the sine signal to generate a first multiplied signal, integrating the first multiplied signal over one wobble cycle to generate a quadrature component of the phase error, generating a cosine signal having the first frequency, multiplying the sampled wobble signal with the cosine signal to generate the second multiplied signal, and integrating the second multiplied signal over one wobble cycle to generate an in-phase component of the phase error, and detecting the phase error as a function of the quadrature and the in-phase components of the phase error. Furthermore, the method can include calculating the phase error by an arctangent function of the quadrature and the in-phase components.

The present disclosure can also provide a method of correcting phase slip where modifying the phase error by adding the phase bias can further include generating the phase bias, and producing a generated phase error by combining the phase bias and the phase error. The method can also include changing the magnitude of the phase bias to a target magnitude at a slow average rate. The method can further include detecting an unstable situation, and adjusting the modified phase error if the unstable situation is detected. The method of detecting the unstable condition can further include checking a first condition if the magnitude of the phase bias is larger than a predetermined threshold, and checking a second condition if a sign of the phase error and a sign of the phase bias are the same. Additionally, the method can also include adjusting the generated phase error by a magnitude of $2\pi$ or adjusting the generated phase error by subtracting the phase bias.

The present disclosure can also describe a method of correcting phase slip where modifying the phase error by adding the phase bias can further include shifting a phase of the controlled signal with the phase bias and changing the phase bias to a target magnitude at a slow average rate.

Aspects of the disclosure can also include shifting a phase of the sine signal with the phase bias, shifting a phase of the cosine signal with the phase bias and changing the phase bias to a target magnitude at a slow average rate.

Additionally, the present disclosure can direct to a method of correcting phase slip that can also include using a sine lookup table to store a cycle of the sine signal, reading from the sine lookup table cyclically according to a first sequence, using a cosine lookup table to store a cycle of the cosine signal, reading from the cosine lookup table cyclically according to a second sequence, shifting the first sequence by an integer number, and shifting the second sequence by the integer number. Further more, the method can also include calculating the integer number according to the phase bias, and changing the phase bias to a target magnitude at a slow average rate or adjusting the magnitude of the integer number from 0 to a target number at a slow average rate.

The present disclose can provide an apparatus for correcting a phase slip. The apparatus can include an analog to digital converter (ADC) that can sample a received wobble signal having a first frequency to generate a sampled wobble signal, where the wobble signal can be sampled at a second frequency that can correspond to a frequency of a sampling signal, a wobble demodulator that can generate a phase error based on a difference between a phase of the sampled wobble signal and a phase of a controlled signal, a phase bias generator that can generate a phase bias, the phase bias being used to modify the phase error, and a voltage controlled oscillator (VCO) that can modify the second frequency based on the modified phase error. The wobble signal can be a sinusoidal signal and coded with information, where the information can be coded using at least one of phase modulation, frequency modulation and pre-pitting. A controller can decode the information in the wobble signal and detect a phase slip based on the information decoded. The controller can also determine a number of wobble signal cycles required to correct the detected phase slip based on the decoded information. The phase bias generator can change the phase bias to a target magnitude by a slow average rate.

The wobble demodulator in the apparatus can further include a sine signal generator that can generate a sine signal having the first frequency, a multiplier that can multiply the sampled wobble signal with the sine signal to generate a first multiplied signal, an integrator that can integrate the first multiplied signal over one wobble cycle to generate a quadrature component of the phase error, a cosine signal generator that can generate a cosine signal having the first frequency, a multiplier that can multiply the sampled wobble signal with the cosine signal to generate a second multiplied signal, an integrator that can integrate the second multiplied signal over one wobble cycle to generate an in-phase component of the phase error, and a phase detector that can generate the phase error as a function of the quadrature and the in-phase components. Additionally, the phase detector can use an arctangent function to calculate the phase error.

The apparatus of correcting the phase slip can also include an adder that combines the phase bias to the phase error to produce a modified phase error. The adder can adjust the modified phase error when an unstable situation is detected. The apparatus can also include a timing loop filter that can transmit the modified phase error into a voltage; the voltage can control the VCO to adjust the frequency of the sampling signal.

The apparatus of correcting the phase slip can also include a sine lookup table that can store a cycle of the sine signal that the sine signal generator can provide a value from the sine lookup table according to a first sequence, and a cosine lookup table that can store a cycle of the cosine signal that the cosine signal generator can provide a value from the cosine lookup table according to a second sequence. The sine signal generator can adjust the first sequence according to the phase bias, and the cosine signal generator can adjust the second sequence according to the phase bias.

The present disclosure can also describe an apparatus of correcting phase slip where the phase detector can adjust the quadrature and the in-phase components according to the phase bias before generating the phase error.

Aspects of the disclosure can provide a data recording system. The data recording system can include a tracking apparatus that can follow a track of a storage medium and receive a wobble signal, a recording apparatus that can present data on the track of the storage medium, an analog to digital converter (ADC) that can sample the received wobble signal having a first frequency to generate a sampled wobble signal, where the wobble signal is sampled at a second frequency that corresponds to a frequency of a sampling signal, a wobble demodulator that can generate a phase error based on a difference between a phase of the sampled wobble signal and a phase of a controlled signal, a phase bias generator that can generate a phase bias, the phase bias being used to modify the phase error, and a voltage controlled oscillator (VCO) that can modify the second frequency based on the modified phase error.

Furthermore, the data recording system can also include a sine signal generator that can generate a sine signal having the first frequency, a multiplier that can multiply the sampled wobble signal with the sine signal to generate a first multiplied signal, an integrator that can integrate the first multiplied signal over one wobble cycle to generate a quadrature component of the phase error, a cosine signal generator that can generate a cosine signal having the first frequency, a multiplier that can multiply the sampled wobble signal with the cosine signal to generate a second multiplied signal, an integrator that can integrate the second multiplied signal over one wobble cycle to generate an in-phase component of the phase error, and a phase detector that can generate the phase error as a function of the quadrature and the in-phase components.

Additionally, the data recording system can include a sine lookup table that can store a cycle of the sine signal that the sine signal generator can provide a value from the sine lookup table according to a first sequence, a cosine lookup table that can store a cycle of the cosine signal, and the cosine signal generator can provide a value from the cosine lookup table according to a second sequence. The apparatus can also include an adder that can combine the phase bias to the phase error to produce a modified phase error, and can adjust the modified phase error when an unstable situation is detected. Within the apparatus, the sine signal generator can adjust the first sequence according to the phase bias, and the cosine signal generator can adjust the second sequence according to the phase bias.

According to another aspect of the disclosure, the phase detector in the apparatus can calculate the phase error by an arctangent function of the quadrature and the in-phase components and can adjust the quadrature and the in-phase components according to the phase bias before the calculation.

BRIEF DESCRIPTION OF THE DRAWINGS

Various exemplary embodiments of this disclosure will be described in detail with reference to the following figures, wherein like numerals reference like elements and wherein.

DETAILED DESCRIPTION OF EMBODIMENTS

Storage media that can continually store data in a physical media, such as an optical disc, can be very useful because of its relative high storage capability.

Figure 1:
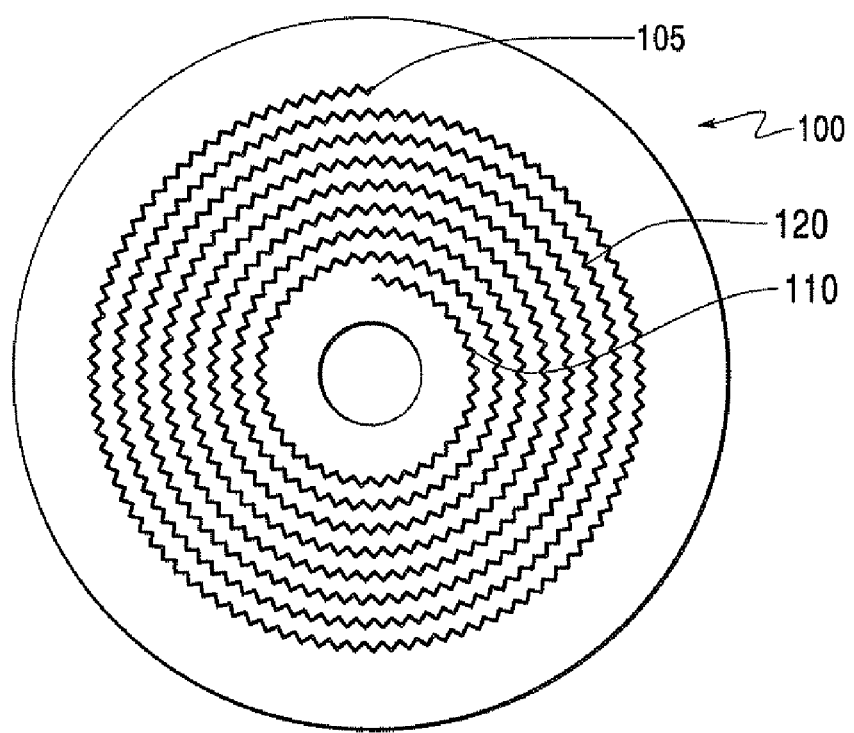
FIG. 1 is a diagram showing an exemplary surface of an optical disc with a spiral track.

Even though the recording is continuous, address information may be needed to improve the efficiency of recording. For example, FIG. 1 is a diagram showing an exemplary surface of an optical disc 100 with a spiral track 105. On the spiral track 105, data can be stored on a recording layer by forming either data pits or data marks. During recording, the disc is usually spinning around its center with an angular velocity instructed by a controller. Recording data with a constant linear length of pits and marks is preferred to improve the data storage capability of the optical disc. To assist in maintaining constant length of marks and pits, timing and address information can be encoded in the spiral tracks. The address at a location can be used to guide where to write data to the disc.

One technique to code timing and address information is to wobble the track. Wobble can be referred to a continuously sinusoidal deviation of the track from an average centerline. The variation of the track is in the radial direction. Wobble can be utilized to code the address information via various techniques, such as pre-pits, frequency modulation, and phase modulation. The length of a wobble period can be used to determine the recording clock. Normally, one address is given to a group of predetermined number of wobbles. Inside the group, sequential numbers can be used to represent the locations of each wobble in the group. Inside each wobble, there can be numerous channel bit intervals depending on the specification of the optical media. The location of each channel bit interval can be correlated to the phase of the physical wobble.

Wobble, which can be the spatial sinusoidal deviation of a physical track, can be converted to an electrical voltage signal, which is sinusoidally modulated. The conversion can be handled by an optical apparatus in a recorder that tracks the wobble using a constant linear velocity. Therefore, the phase of the physical wobble, which is related to the location, can be converted into phase of the wobble signal, which is related to timing. In the optical disc recording system, the wobble signal can serve as an input to a synchronization mechanism to synchronize with another input, which is a signal from an internal oscillator that can be controlled by the recorder. Therefore, the timing of the internal oscillator can be associated with the location of the physical wobble. The internal oscillator can be used to guide the timing of recording. Based on the timing information of the internal oscillator, data can be written on the appropriate location referring to the physical wobble.

Occasionally, due to defects, physical disturbance of the recorder or other distortions, the lock to the physical wobble may be lost temporarily. When the lock to the physical wobble is recovered, the phase of the internal oscillator may not be correctly correlated to the location of the physical wobble. There may exist one or more cycles of difference. The discrepancy in the phase of the internal oscillator and the location of the physical wobble is referred as wobble phase slip.

Wobble phase slip can cause various types of problems. One particular problem can happen during data recording. Occasionally, the recording process may stop, and then continue. If there exists a phase slip, for example the internal oscillator signal is one wobble cycle behind the physical wobble when the stop happens. When the recording process continues, the optical apparatus tracks the phase of the physical wobble for another time to find out the previous stopping location. Somehow, there may be no wobble phase slip at this time. Because the phase of the internal oscillator is used to record and track the stopping location, the recording can continue one cycle behind the real stopping location. Consequently, the previous written data in the last physical wobble cycle can be overwritten or destroyed. To avoid data damaging, it is desirable that the correction of wobble phase slip can be achieved during the recording session if phase slip happens. In this way, when the recording stops, the internal oscillator signal can record the same phase as the physical wobble.

For a general understanding of the features of the present disclosure, reference is made to the optical disc as a specific type of continuous recording storage media for the sake of clarity, familiarity, and ease of description. However, it should be appreciated that the method and apparatus disclosed herein, as discussed below, can be equally applied to any known or later-developed continuous recording storage media.

The present disclosure proposes that wobble phase slip can be recovered by artificially adding a phase bias in a synchronization mechanism.

As described above, a synchronization mechanism can be used to synchronize an internal oscillator signal and a wobble signal. When the two signals are synchronized, a phase error of the internal oscillator signal and the wobble signal is around zero. When the phase error is not zero, the synchronization mechanism can adjust an offset in order to correct the phase error. After some time, the phase error can return to around zero. According to the present disclosure, the synchronization mechanism can be manipulated by intentionally adding a phase bias. The phase bias can trick the synchronization mechanism that there exists a phase error, so the synchronization mechanism can work by itself to synchronize the internal oscillator and the wobble signal with the desired phase bias.

Figure 2:
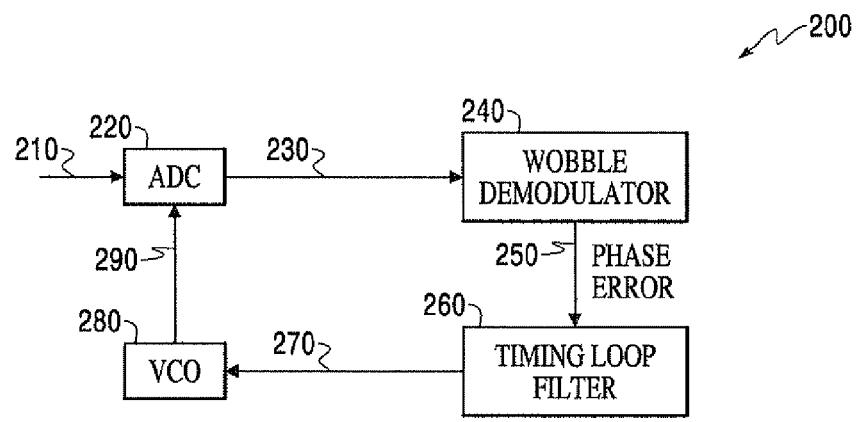
FIG. 2 is a diagram showing an exemplary wobble timing loop.

Among the various synchronization mechanisms, a phase lock loop can be used. FIG. 2 is a diagram showing an exemplary wobble timing loop 200, which is a phase lock loop using digital signal processing technology. The wobble timing loop 200 can lock the phase of an internal oscillator signal to the phase of an input signal, such as a wobble signal 210.

The wobble timing loop 200 can include an analog to digital converter (ADC) 220, a wobble demodulator 240, a timing loop filter 260 and a voltage controlled oscillator (VCO) 280, coupled together as shown. The ADC 220, wobble demodulator 240, timing loop filter 260 and VCO 280 can cooperatively work together to lock the phase of the internal oscillator to the phase of the wobble signal 210.

As mentioned above, the wobble signal 210 can be a continuous analog voltage signal transmitted by an optical apparatus that is capable of tracking the physical wobble. Generally, the optical apparatus can track the physical wobble by a constant linear velocity, and transmit the phase of the physical wobble into the phase of the wobble signal 210. So, the phase of the wobble signal can move forward with a constant velocity. When the physical wobble is sinusoidally modulated, the wobble signal 210 can be a sinusoidally modulated voltage signal.

The ADC 220 can convert the wobble signal 210 into a discrete wobble signal 230 with aid from a sampling signal 290. When the wobble signal 210 is a sinusoidally modulated continuous analog signal, the discrete wobble signal 230 can be a sinusoidally modulated discrete digital signal. Generally, the sampling signal 290 has a nominal frequency $f_0$, which can be L times of the frequency of the wobble signal 210. The frequency of the sampling signal 290 may change corresponding to the other components of the timing loop 200. The frequency change of the sampling signal can result in the phase change of the discrete wobble signal 230. When the sampling frequency is larger, the phase of discrete digital signal can move forward slower, and when the sampling frequency is smaller, the phase of the discrete digital signal can move forward faster. So adjusting the frequency of the sampling signal 290 can shift the phase of the discrete wobble signal 230.

The wobble demodulator 240 can be designed to compare the phase of the discrete wobble signal 230 to the phase of an internal oscillator (not shown) that can be controlled by the recorder, and output a phase error signal 250 representing a phase difference. An exemplary demodulator will be described in detail below.

The timing loop filter 260 can output a voltage signal 270 based on the phase error signal 250. For example, when the average of the phase error signal 250 is around zero, the timing loop filter 260 can output a voltage signal of value $V_0$. When the average of the phase error signal is larger than zero, the timing loop filter 260 can output the voltage signal 270 of value larger than $V_0$. When the average of the phase error signal is smaller than zero, the timing loop filter 260 can output the voltage signal 270 of value smaller than $V_0$.

The VCO 280 can generate the sampling signal 290 with a frequency controlled by the voltage signal 270. For example, when the voltage signal 270 is of value $V_0$, the frequency of the sampling signal 290 can be the nominal frequency $f_0$. When the voltage signal 270 is of value larger than $V_0$, the frequency of the sampling signal 290 can be larger than $f_0$. When the voltage signal 270 is of value smaller than $V_0$, the frequency of the sampling signal 290 can be smaller than $f_0$. In addition, the nominal frequency $f_0$ can be L times of the frequency of the wobble signal 210, so that there are L sampling points in one wobble signal cycle. When the frequency of the sampling signal 290 keeps at the nominal frequency, the L sampling points in each wobble cycle can be evenly spaced. Consequently, the phase of the discrete wobble signal 230 can move forward with a consistent velocity.

The components in the wobble timing loop 200 can cooperatively work together to drive the phase error signal 250 to be around zero. When the phase error signal 250 is zero, which can mean that there is no phase difference between the discrete wobble signal 230 and the internal oscillator signal. This further means that the wobble signal 210 is sampled at the right sampling points with the aid of the sampling signal 290. The timing loop filter 260 can output a voltage signal of value $V_0$. The VCO 280 can continuously generate the sampling signal 290 of frequency $f_0$ to keep sampling the wobble signal 210 at the same intervals in each wobble cycle. Therefore, the phase of the discrete wobble signal 230 can keep moving forward at the same rate as the internal oscillator signal, such that the phase error signal 250 can be kept around zero.

When phase error signal 250 is not zero, this can mean that the phase of the discrete wobble signal 230 and the phase of the internal oscillator signal are not the same. For example, the discrete wobble signal 230 can be ahead of the internal oscillator signal. Consequently, the timing loop filter 260 can output the voltage signal 270 of value V that can be larger than $V_0$. Based on larger voltage signal 270, the VCO 280 can generate the sampling signal 290 of frequency f that can be larger than $f_0$. Since larger sampling frequency can slow down the phase of the discrete wobble signal 230, so the phase difference of the discrete wobble signal 230 and the internal oscillator signal can become smaller. If the phase difference still exists, the timing loop 200 can work the similar way as described above to continuously reduce the difference. After some time, the phase difference can be close enough to zero. Finally, the phase error signal 250 can return to around zero.

Figure 3:
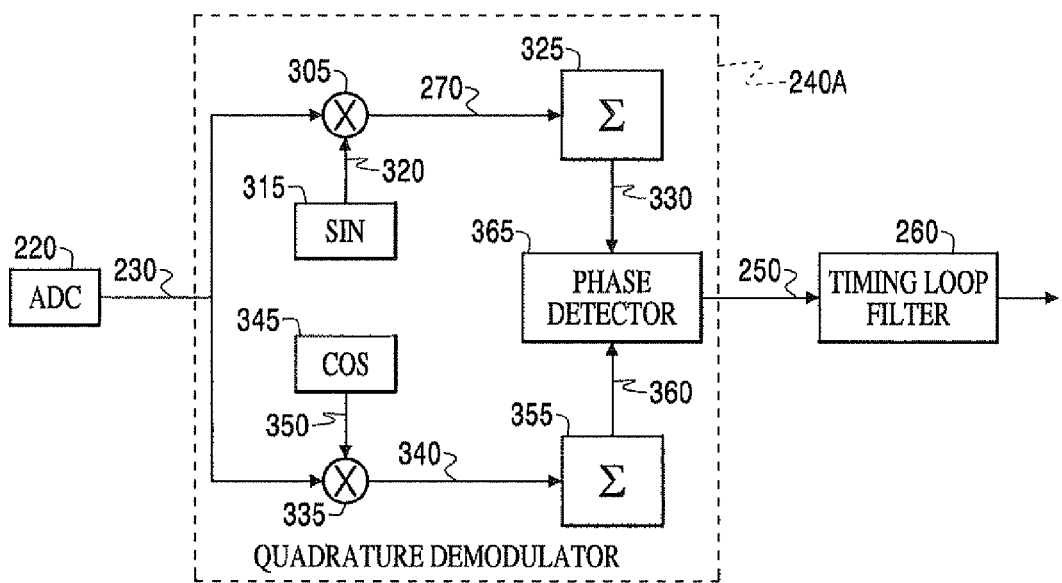
FIG. 3 is a diagram showing an exemplary wobble demodulator.

The wobble demodulator 240 can be designed via various techniques to compare the phases. FIG. 3 is a diagram showing an exemplary wobble demodulator. The exemplary wobble demodulator is a digital quadrature demodulator 240A. The digital quadrature demodulator 240A can generate a phase error signal 250 based on the phase difference of the discrete wobble signal 230 and an internal oscillator. The digital quadrature demodulator 240A can utilize two parallel signal processing paths to calculate a quadrature component and an in-phase component of the phase difference. Then a phase detector can generate the phase error 250 based on the quadrature and the in-phase components of the phase difference.

The path to calculate the quadrature component can include three components: a sine signal generator 315, a multiplier 305 and an integrator 325.

The sine signal generator 315 can cyclically provide a sine signal 320 of one cycle to the multiplier 305. Generally, the sine signal 320 can be controlled to have the same frequency as the wobble signal 210. Therefore, the sine signal generator 315 can be treated as an internal oscillator that can oscillate at a controlled frequency, which can be the same as the wobble signal 210.

The multiplier 305 can multiply the discrete wobble signal 230 with the sine signal 320, and provide an output signal 310 to the integrator 325. Both the sine signal 320 and the discrete wobble signal 230 can have about the same frequency as the wobble signal 210. Because of that, the output signal 310 can have two parts, a high frequency part and a low frequency part. The high frequency part can generally have a frequency that can be about twice the frequency of the wobble signal 210. The low frequency part can be proportional to a cosine value of a phase difference of the discrete wobble signal 230 and the sine signal 320.

The integrator 325 can integrate the signal 310 over one cycle of the wobble signal. The integration of the high frequency part over one wobble cycle can be zero. Therefore, the integrator 325 can operate like a low pass filter that can average out the high frequency part and output a low frequency signal 330. The low frequency signal 330, which can be proportional to the cosine value of the phase difference, is a quadrature component of the phase difference.

The path to calculate the in-phase component can also include three components: a sine signal generator 345, a multiplier 335 and an integrator 355.

The sine signal generator 345 can cyclically provide a cosine signal 350 of one cycle to the multiplier 335. Generally, the cosine signal 350 can be controlled to have the same frequency as the wobble signal 210. Therefore, the cosine signal generator 345 can be treated as an internal oscillator that can oscillate at a controlled frequency, which can be the same as the wobble signal 210.

Generally the cosine signal 350 and the sine signal 320 can have the same phase and frequency. The phase can be referred as a phase of the internal oscillator. The frequency can be referred as a frequency of the internal oscillator.

The multiplier 335 can multiply the discrete wobble signal 230 with the cosine signal 350, and provide an output signal 340 to the integrator 355. Both the cosine signal 350 and the discrete wobble signal 230 can have about the same frequency as the wobble signal 210. Because of that, the output signal 340 can have two parts, a high frequency part and a low frequency part. The high frequency part can generally have a frequency that can be about twice the frequency of the wobble signal 210. In addition, the low frequency part can be proportional to a sine value of the phase difference of the discrete wobble signal 230 and the cosine signal 350.

The integrator 355 can integrate the signal 340 over one cycle of the wobble signal. The integration of the high frequency part over one wobble cycle can be zero. Therefore, the integrator 355 can operate like a low pass filter that can average out the high frequency part and output a low frequency signal 360. The low frequency signal 360, which can be proportional to the sine value of the phase difference, is the in-phase component of the phase difference.

Both the quadrature component 330 and the in-phase component 360 can be received by a phase detector 365. The phase detector 365 can generate a phase error signal 250 based on the analysis of the quadrature component 330 and in-phase component 360. The phase error signal 250 can be related to the phase difference of the discrete wobble signal 230 and the phase of the internal oscillator 315 or 345. Various techniques can be used in the phase detector to calculate the phase error signal 250. For example, the phase error signal 250 can be calculated by an arctangent function atan(Q, I) with the quadrature component 330 (Q) and the in-phase component 360 (I) as the inputs to the function. In such an example, the phase error signal 250 is an angle in the range of $[-\pi, \pi]$. This angle can be the co-terminal angle of the real phase difference of the discrete wobble signal 230 and the internal oscillator 315 or 345.

Figure 4:
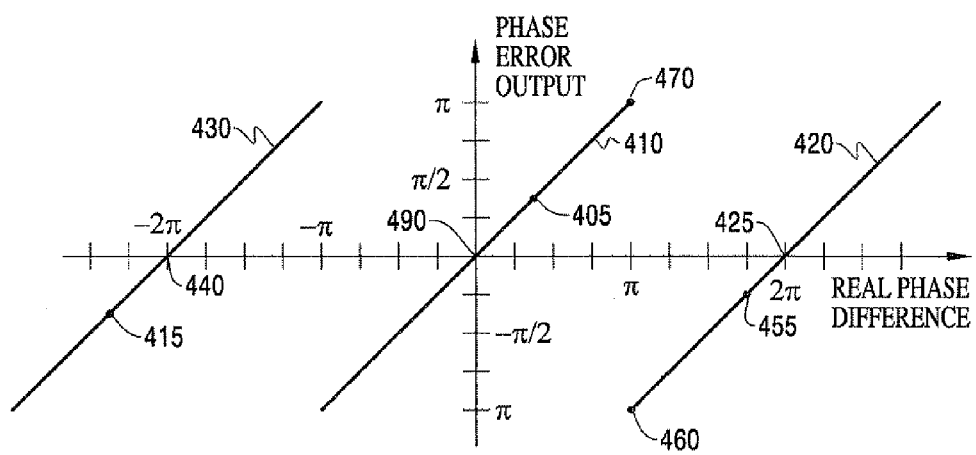
FIG. 4 is a diagram showing an exemplary characteristic of a wobble demodulator.

FIG. 4 is a diagram showing a characteristic of the exemplary wobble demodulator 240A. A series of parallel lines having a slope of about one can represent a response of the wobble demodulator 240A. The phase error 250, which is the output of the wobble demodulation, can be in the range of $[-\pi, \pi]$, no matter the range of the real phase difference.

When the real phase difference of the discrete wobble signal 230 and the internal oscillator signal is in the range of $[-\pi, \pi]$ the phase error 250 can be the same as the real phase difference, the relationship of the phase error 250 and the real phase difference can be represented by demodulator response line 410.

When the real phase difference of the discrete wobble 230 and the internal oscillator signal is out of the range of $[-\pi, \pi]$, the phase error 250 is the co-terminal angle of the real phase difference in the range of $[-\pi, \pi]$. For example, if the real phase difference of the discrete wobble signal 230 and the internal oscillator is in the range of $[-3\pi, -\pi]$, the response of the wobble demodulator 240A can be represented by demodulator response line 430. As can be seen, the phase error 250 is in the range of $[-\pi, \pi]$, and can be larger than the real phase difference by $2\pi$. If the real phase difference is in the range of $[\pi, 3\pi]$, the corresponding response of the wobble demodulator 240A can be represented by line 420. As can be seen, the phase error 250 is still in the range of $[-\pi, \pi]$, and can be less than the real phase difference by $2\pi$.

If a demodulator having the characteristic as shown in FIG. 4, such as the demodulator 240A, is used in the timing loop 200, the timing loop 200 can synchronize the discrete wobble signal 230 and the internal oscillator to have zero phase error. In another word, the timing loop 200 by itself can pull the response of the demodulator moving along a response line from an initial response to a destination response that is on the X axis, such as response 440, response 490 and response 425. The response line can be the line that includes the initial response. The destination response can be a response having zero phase error. For example, a response line 410 can include a response 405, which is the initial response. The timing loop 200 can pull the response of the demodulator 240A moving along the response line 410 from the response 405 to the response 490, which is zero phase error and zero real phase difference.

However, when the two signals are synchronized to have zero phase error, the real phase difference can be non-zero, such as $2\pi$ or $-2\pi$. The real phase difference can be a value of an integer times $2\pi$.

For another example, when the real phase difference is outside range of $[-\pi, \pi]$, such as an initial response 415 which is belong to a response line 430. The timing loop 200 can pull the demodulator response along the response line 430 moving to the destination response 440, which is zero phase error but $-2\pi$ phase difference, equivalent to one wobble cycle.

As can be seen, although the timing loop 200 can lock the phase of the discrete wobble signal 230 and the internal oscillator signal to have zero phase error, the real phase difference of the two signals may be one or more wobble cycles. This can be referred to as wobble phase slip. The present embodiments can correct the wobble phase slips knowing the number of cycles of wobble phase slip.

Generally, a controller in the optical recording system can expect information in the physical wobble. When the expected information arrives at a different wobble cycle, the controller can detect that wobble phase slip occurred, and can determine a number of wobble cycles that need to be corrected. The controller can then trigger a phase slip correction process to correct the phase slip.

Figure 5:
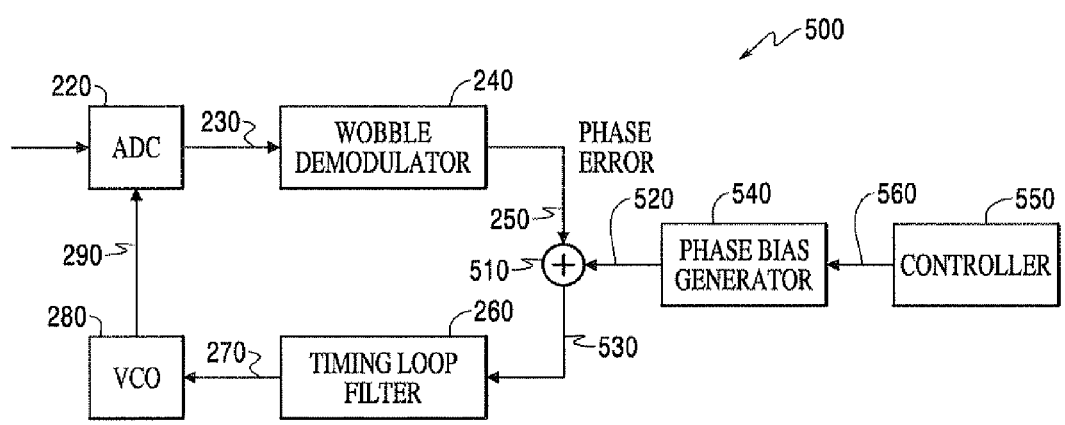
FIG. 5 is a diagram showing an exemplary timing loop of wobble phase correction by adding a phase bias to a phase error.

FIG. 5 is a diagram showing a timing loop 500 using an exemplary method to correct the wobble phase slips. The timing loop 500 in FIG. 5 is similar to the timing loop 200, except instead of using the phase error signal 250 as the input to the timing loop filter 260, the timing loop 500 can use a modified phase error signal 530. The modified phase error 530 can be provided by an adder 510, which can add the phase error signal 250 with a phase bias signal 520. The phase bias signal 520 can be generated by a phase bias generator 540 under the control of a controller 550.

Instead of driving the phase error signal 250 to zero, the timing loop 500 can drive the modified phase error signal 530 to zero. Under normal working condition, which can be, wobble phase slip free, the phase bias signal 520 can be zero. Then the timing loop 500 is similar to the timing loop 200, and can be used as the timing loop 200. When the wobble phase slip presents, the phase bias generator 540 can be triggered to generate the phase bias signal 520 according to an instruction signal from the controller 550. Because the modified phase error signal 530 is the sum of the phase error signal 250 and the phase bias signal 520. To make the modified phase error 530 to be zero, the phase error signal 250 can be the opposite of the phase bias signal 520. Accordingly, the real phase difference can change too.

An exemplary method for wobble phase slip correction can be explained with reference to FIG. 4 and FIG. 5.

When a wobble phase slip presents, the real phase difference can be non-zero, but the phase error can be zero. For example, the physical wobble can be one wobble cycle ahead of the internal oscillator, then the discrete wobble signal 230 can be one cycle ahead of the internal oscillator. Thus, the real phase difference can be $2\pi$, and the phase error signal 250 can be zero, as indicated by a response 425 on the FIG. 4.

Initially, when the phase bias signal 520 is zero, the modified phase error signal 530 is a sum of the phase error signal 250 and the phase bias signal 520, so can be zero.

After the wobble phase slip has been detected, the phase bias generator 540 can be triggered to generate a positive phase bias 520 that is added to the phase error 250. Thus the modified phase error 530, which is the sum of the phase error signal 250 and the phase bias signal 520, can also be positive. As describe above, the timing loop filter 260 can generate a voltage signal 270 of value V that is larger than the nominal value $V_0$, and the VCO 280 can generate a sampling signal 290 of a frequency f that is larger than the nominal frequency $f_0$. Consequently, larger sampling frequency can slow down the discrete wobble signal 230, and make the real phase difference to be smaller.

More specifically, the phase bias signal 520 can be $\pi/4$. Initially, the demodulator response can be around response 425, which has $2\pi$ real phase differences, and zero phase error. So the modified phase error 530 can be $\pi/4$.

As described above, the timing loop 500 can pull the demodulator response along a response line to make the modified phase error signal 530 to be zero. In this example, in order to make the modified phase error signal 530 to be zero, the phase error signal has to be negative to compensate for the positive phase bias signal 520. So the timing loop 500 can pull the demodulator response along the response line 420, which is the response line including the initial response 425, in a direction of negative phase error to a destination response 455, which has $-\pi/4$ phase error, and $7\pi/4$ real phase difference. Accordingly, the modified phase error 530 can be zero when the demodulator response is at the destination response 455.

Theoretically, changing the phase bias 520 slowly from 0 to $2\pi$, the real phase difference can move from $2\pi$ to zero. Accordingly, the wobble phase slip can be corrected.

Practically, when the phase bias 520 approaches $\pi$, the timing loop 500 can work unstably. As can be seen, the demodulator response line 420 breaks at a response 460, where the phase error is $-\pi$. When the phase bias 520 approaches $\pi$, the phase error signal 250 can approaches $-\pi$, and the modified phase error 530 is zero. However, because of noise or disturbance, the phase error signal 250 can be $\pi$, which is represented by response 470. This can make the modified phase error 530 to be $2\pi$ instead of zero. When the phase error signal jumps between $\pi$ and $-\pi$, the timing loop performance may be unstable.

Various techniques can be used to remedy this situation. One technique is based on the observation that the sign of the phase error signal 230 changes when the situation occurs. When the sign of the phase error 230 changes, the modified phase bias 530 can be adjusted, such as setting the phase bias signal 520 to be zero, or using equation 1:

$$\varphi_{modified} = \begin{cases} \varphi_{error} + \varphi_{bias} - 2\pi & \text{if } \varphi_{error} > 0 \text{ and } \varphi_{bias} > \pi/2 \\ \varphi_{error} + \varphi_{bias} + 2\pi & \text{if } \varphi_{error} < 0 \text{ and } \varphi_{bias} < -\pi/2 \\ \varphi_{error} + \varphi_{bias} & \text{otherwise} \end{cases} \quad (1)$$

where $\varphi_{error}$ is the phase error signal 250, $\varphi_{bias}$ is the phase bias signal 520, and the $\varphi_{modified}$ is the modified phase error signal 530.

By this way, the modified phase error 530 can be adjusted to avoid the unstable situation. Accordingly, the system can be made stable, and the real phase difference can be continuously pulled from $2\pi$ to 0 if the phase bias 520 changes from 0 to $2\pi$.

A simplified conceptual example can be used to describe the phase slip correction process according to the present embodiments. Assumptions can be made that each wobble cycle can include four channel bit intervals. When wobble phase slip occurs, such as the physical wobble is one cycle ahead of the internal oscillator signal, a phase bias can be added in the timing loop to make the timing loop 500 to adjust the sampling frequency to be higher, so to slow down the discrete wobble signal. Then one wobble cycle can include more channel bit intervals, such as six channel bit intervals. Thus, two wobble cycles can include 12 channel bit intervals, which can be equivalent to three cycles of the internal oscillator. Consequently, after two wobble cycles of the adjustment, the internal oscillator signal can catch up the wobble signal. The timing loop can then return to the normal condition.

Figure 6:
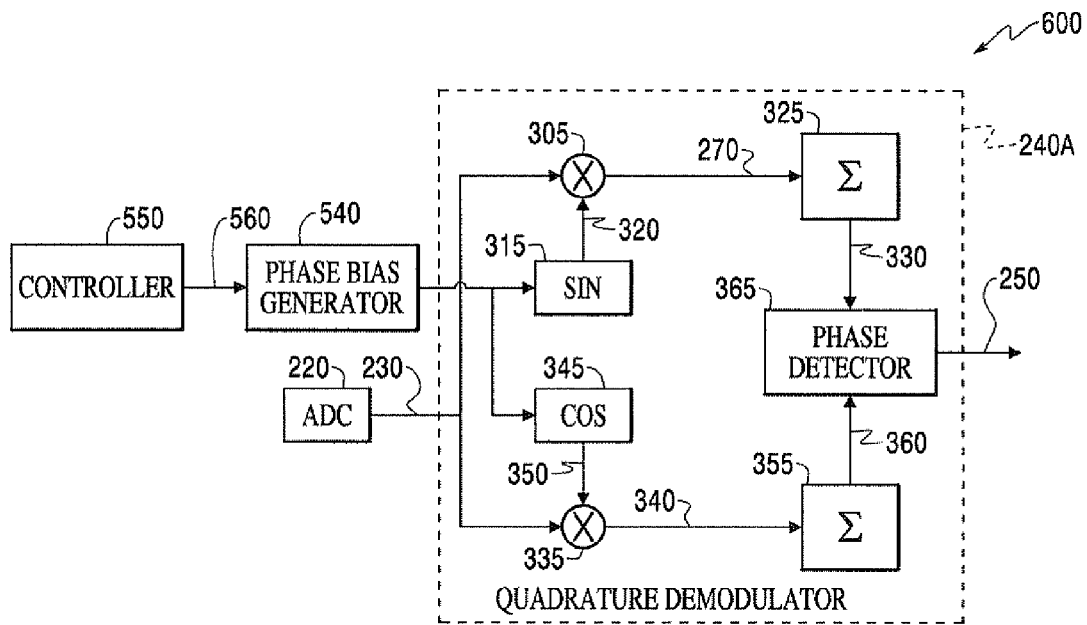
FIG. 6 is a diagram showing an exemplary timing loop of wobble phase correction by adding the phase bias in the wobble demodulator.

FIG. 6 is a diagram showing another exemplary timing loop 600 of wobble phase correction. Instead of adding phase bias in the phase error signal 250 in the above example, the phase bias can be added in the wobble demodulator. As illustrated in FIG. 6, phase bias 520 can be added in the sine and cosine signal generators 315 and 345. As described above, the sine and cosine signal generator can perform the function of an internal oscillator. The phase error signal 250 outputted from the wobble demodulator 240A can be related to the real phase difference of the discrete wobble signal 230 and the internal oscillator. The timing loop 600 can keep the phase error signal to around zero.

The exemplary method can be explained using a similar example as previous method. In the example, initially, the phase of the discrete wobble signal 230 is more than the phase of the internal oscillator by $2\pi$. Therefore, the real phase difference can be $2\pi$, and the phase error can be zero, which can be represented by point 425 in FIG. 4.

The method can begin with adding a negative phase bias in the internal oscillator, which includes both the sine signal generator 315 and the cosine signal generator 345. This can result in a non-zero phase error signal 250. The timing loop 600 can keep the phase error signal 250 to be around zero. In order for the phase error signal 250 to be around zero, the timing loop 600 can shift the phase of the discrete wobble signal 230 by a negative value about the same as the negative phase bias. Therefore, the real phase difference of the discrete wobble signal 230 and the internal oscillator can also change from $2\pi$ by the negative value. Slowly changing the phase bias from 0 to $-2\pi$, the timing loop 600 can shift the phase of the discrete wobble signal 230 by $-2\pi$, thus the real phase difference of the discrete wobble signal 230 and the internal oscillator can change from $2\pi$ to 0. Accordingly, the wobble phase slip can be corrected.

It is noted that the phase error signal 250 can be kept around zero in this exemplary method, so the method can effectively eliminate the unstable situation in the above exemplary method without any additional adjustments.

Often the sine and cosine signal generators in the demodulator can be implemented as look-up tables. For example, the sine signal generator 315 can include L rows of cells. The row number of a cell can correspond to an angle in the range of a wobble cycle, and the value in the cell can be the sine value of the angle. The L angles that related to the L row numbers can be evenly spaced in a wobble cycle. When the phase bias is zero, which is regarded as the nominal working condition, the sine and cosine signal generators can sequentially and cyclically provide a value from the L rows to the multipliers. For example, the sine and cosine signal generators can provide values of the following rows sequentially: 1, 2, 3, ..., L-2, L-1, L, 1, 2, 3, ..., L-2, L-1, L, 1, 2, ....

When the phase bias is non-zero, the sine and cosine signal generators can shift the row number by m referring to the nominal working condition, and still sequentially and cyclically provide a value in the L rows to the multipliers. m can be calculated by equation 2:

$$m = \text{round}\left(\frac{L\varphi_{bias}}{2\pi}\right) \quad (2)$$

For example, if m is two, instead of providing the values of the above sequence, the sine and cosine signal generator can provide value in a row according to the following row sequence: 3, 4, 5, ..., L, 1, 2, 3, 4, 5, ..., L, 1, 2, 3, 4, .... In such a configuration, the operation of increasing the phase bias from 0 to $2\pi$, can be accomplished by increasing the m from zero to L.

Figure 7:
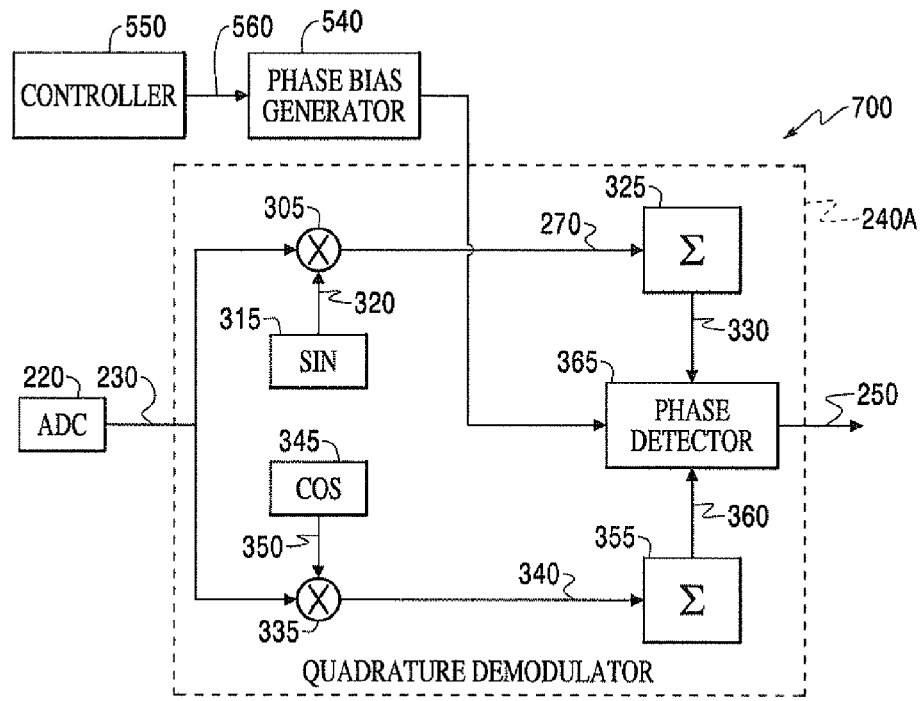
FIG. 7 is a diagram showing an exemplary timing loop of wobble phase correction by adding the phase bias in a phase detector.

FIG. 7 is a diagram showing another exemplary timing loop of wobble phase correction. Similar to the timing loop 200, the wobble timing loop 700 can keep the phase error signal 250 around zero.

In the exemplary wobble timing loop 700, the phase bias 520 can be added in the phase detector. Various techniques can be used in the phase detector to add phase bias, such as rotating the incoming data by the phase bias 520. For example, a new set of quadrature and in-phase components (Q', I'), which are corresponding to the quadrature and in-phase components of a modified phase difference, can be calculated and served as the input to an arctangent function. Thus, the modified phase difference is the sum of the phase difference and the phase bias. The calculation of the new set can be based on the quadrature and the in-phase components inputted in the phase detector and sine and cosine values of the phase bias signal 520, such as using equations 3 and 4:

$$Q' = Q \times \cos(\phi_{bias}) + I \times \sin(\phi_{bias}) \quad (3)$$

$$I' = I \times \cos(\phi_{bias}) - Q \times \sin(\phi_{bias}) \quad (4)$$

The exemplary method can be explained similar to the previous methods. In the example, initially, the phase of the discrete wobble signal 230 is more than the phase of the internal oscillator by $2\pi$. Therefore, the real phase difference can be $2\pi$, and the phase error can be zero, which can be represented by point 425 in FIG. 4.

The method can begin with adding a positive phase bias. This can be equivalent to changing the phase of the internal oscillator by a negative phase bias in the above exemplary method showing in FIG. 6. Similar to the above example, phase error signal 250 is then non-zero. As already known, the timing loop 700 can keep the phase error signal 250 to be around zero. In order for the phase error signal 250 to be around zero, the timing loop 700 can shift the phase of the discrete wobble signal 230 by a negative value. Therefore, the real phase difference of the discrete wobble signal 230 and the internal oscillator can also change from $2\pi$ by the negative value. Slowly changing the phase bias from 0 to $2\pi$, the timing loop 700 can shift the phase of the discrete wobble signal 230 by $-2\pi$, thus the real phase difference of the discrete wobble signal 230 and the internal oscillator can change from $2\pi$ to 0. The wobble phase slip can be corrected.

It is noted that the phase error signal 250 can be kept around zero in the this exemplary method, so this exemplary method can effectively eliminate the unstable situation in the exemplary method showing in FIG. 5 without any additional adjustments.

Figure 8:
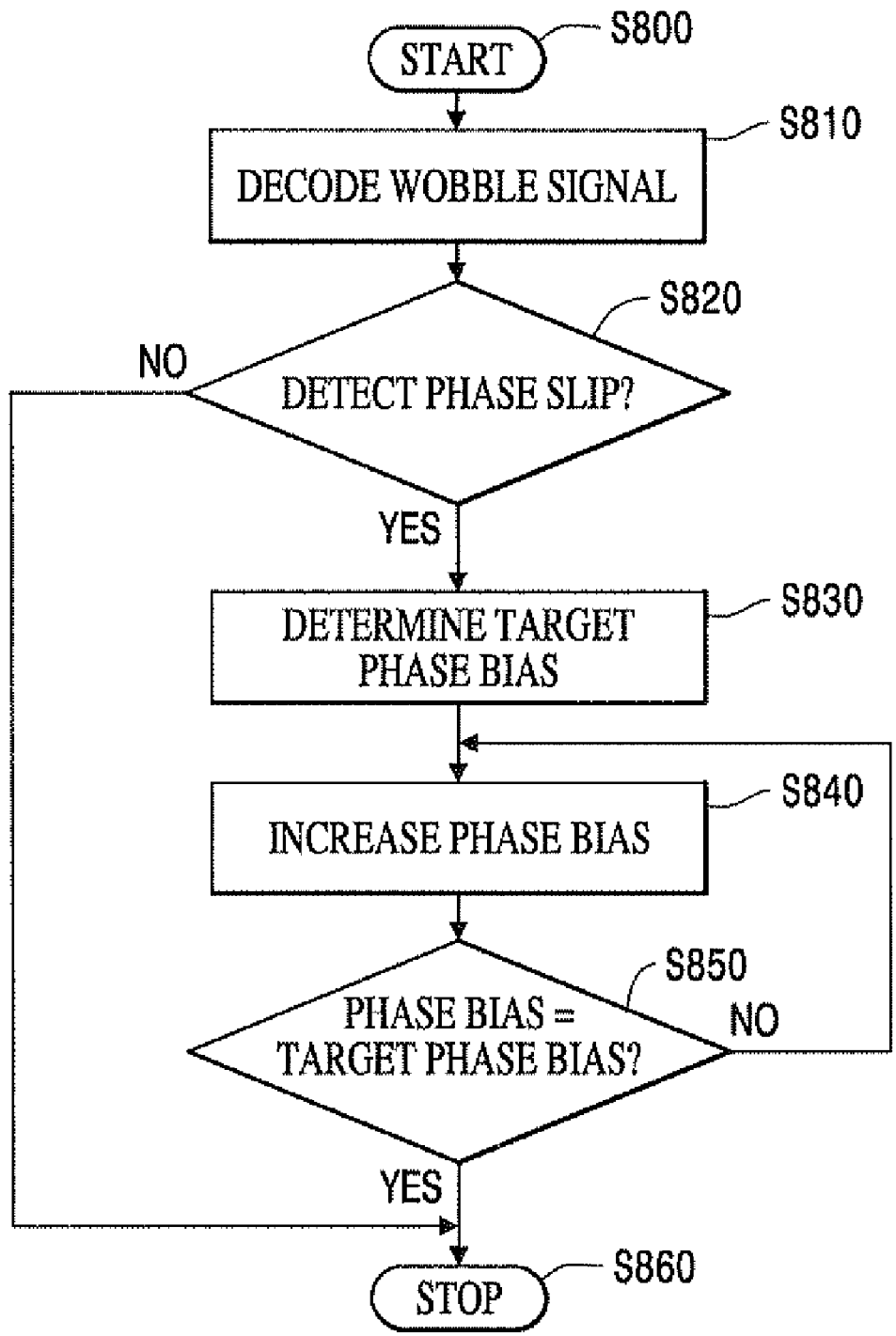
FIG. 8 is a flow chart outlining an exemplary process of wobble phase correction.

FIG. 8 is a flow chart outlining an exemplary process for wobble phase slip correction. The process begins in step S800, and proceeds to step S810, wherein a wobble signal is received and decoded. Then the process proceeds to step S820, where a judgment is made as to whether a phase slip is detected. As described above, the wobble signal can carry information. The information can be used to detect a number of phase slip. If there is no phase slip, the process proceeds to step S860 and terminates. If a phase slip presents, the process proceeds to step S830 to begin the process of phase slip correction.

In step S830, a target phase bias can be determined. For example, to correct a phase slip of one cycle, the process can determined $2\pi$ as the target phase bias. Then the process proceeds to step S840.

In step S840, a phase bias can increase by a small amount. Initially, the phase bias is zero. Each time the process executes the step S840, the phase bias increases by a small amount. In addition, the phase bias may be modified to avoid the unstable situation. For example, equation 1 can be used when the phase bias is applied in the manner of FIG. 5. The process then proceeds to step S850.

In step S850, a judgment is made as to if the phase bias is equal to the target phase bias. If the answer is no, the process continues to step 840, where the phase bias continues to increase by a small amount. If in step S850, the answer is yes, the process of phase slip correction has been completed, the process proceeds to step S860 and terminates.

For the ease and clarity of description, the embodiments are presented with the examples of wobble phase slip of one wobble cycle. However, for a phase slip of multiple wobble cycles, the presented embodiments can be simply repeated or extended to correct the phase slip of multiple cycles.

For the ease and clarity of description, the embodiments are presented with a phase bias changing from 0 to either $2\pi$ or $-2\pi$ in a timing loop. However, after the change of phase bias is more than $\pi$, as long as the timing loop is stable, the phase bias can be reset to zero, and the timing loop can work by itself to correct the rest of the phase error that is within $[-\pi, \pi]$.

While the invention has been described in conjunction with the specific embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for recording, comprising:
 receiving a tracking signal corresponding to a recording track on a storage medium;
 phase-locking an internal signal to the tracking signal by reducing a phase error generated based on the internal signal and the tracking signal;
 generating a phase bias;
 combining the phase bias into the phase error to phase-shift the internal signal from the tracking signal; and
 recording on the recording track based on the internal signal.

2. The method of claim 1, further comprising:
 decoding information in the tracking signal; and
 detecting a phase slip between the internal signal and the tracking signal based on the information; and
 generating the phase bias to correct the phase slip.

3. The method of claim 2, wherein generating the phase bias to correct the phase slip further comprises:
 ramping up or down the phase bias.

4. The method of claim 3, wherein ramping up or down the phase bias further comprises;
 ramping up or down the phase bias from zero to $+2\pi$ or $-2\pi$.

5. The method of claim 4, further comprising:
 ramping up or down the phase bias from zero to $+2\pi$ or $-2\pi$ for a number of times corresponding to a number of cycles of the phase slip.

6. The method of claim 3, further comprising:
 detecting an unstable point; and
 modifying the combined phase error and the phase bias to avoid the unstable point.

7. The method of claim 1, further comprising:
 sampling the tracking signal; and
 demodulating the sampled tracking signal based on an in-phase component and a quadrature component of the internal signal to obtain an in-phase component and a quadrature component of the phase error.

8. The method of claim 7, wherein combining the phase bias into the phase error to phase-shift the internal signal from the tracking signal, further comprises:
   phase-shifting the in-phase component and the quadrature component of the internal signal based on the phase bias.

9. The method of claim 8, further comprising:
   sequence-shifting a first set of values corresponding to the in-phase component in a cycle based on the phase bias;
   sequence-shifting a second set of values corresponding to the quadrature component in a cycle based on the phase bias;
   using the sequence-shifted first set and second set of values to demodulate the sampled tracking signal.

10. The method of claim 7, wherein combining the phase bias into the phase error to phase-shift the internal signal from the tracking signal, further comprises:
    phase-shifting the in-phase component and quadrature component of the phase error based on the phase bias.

11. An apparatus for recording on a storage medium, comprising:
    a pick-up unit configured to generate a tracking signal corresponding to a recording track on the storage medium;
    a phase-locked loop configured to phase-lock an internal signal to the tracking signal by reducing a phase error generated based on the internal signal and the tracking signal, the internal signal being used to record data on the recording track;
    a phase bias generator configured to generate a phase bias; and
    a combiner configured to combine the phase bias into the phase error to phase-shift the internal signal from the tracking signal.

12. The apparatus of the claim 11, further comprising:
    a controller configured to detect a phase slip between the internal signal and the tracking signal based on information decoded from the tracking signal; and
    the phase bias generator configured to generate the phase bias to correct the phase slip.

13. The apparatus of claim 12, wherein the phase bias generator is configured to ramp up or down the phase bias.

14. The apparatus of claim 12, wherein the phase bias generator is configured to ramp up or down the phase bias from zero to $+2\pi$ or $-2\pi$ for a number of times corresponding to a number of cycles of the phase slip.

15. The apparatus of claim 13, wherein the combiner is configure to detect an unstable point, and modify the combined phase error and phase bias to avoid the unstable point.

16. The apparatus of claim 11, further comprising:
    an analog to digital converter (ADC) configured to sample the tracking signal, and convert the sampled tracking signal into digital tracking signal; and
    a demodulator configured to demodulate the digital tracking signal based on an in-phase component and a quadrature component of the internal signal to obtain an in-phase component and a quadrature component of the phase error.

17. The apparatus of claim 16, wherein
    the demodulator comprises:
       an in-phase generator configured to generate the in-phase component of the internal signal; and
       a quadrature generator configured to generate the quadrature component of the internal signal; and
    the combiner is configured to combine the phase bias in the in-phase generator and the quadrature generator to shift the in-phase component and the quadrature component of the internal signal.

18. The apparatus of claim 17, wherein
    the in-phase generator includes a first set of values corresponding the in-phase component of the internal signal in a cycle;
    the quadrature generator includes a second set of values corresponding to the quadrature component of the internal signal in the cycle; and
    the combiner is configured to sequence-shift the first set of values and the second set of values.

19. The apparatus of claim 16, wherein the demodulator further comprises:
    a phase detector configured to detect the phase error based on the in-phase component and the quadrature component of the phase error.

20. The apparatus of claim 19, wherein
    the combiner is configured to combine the phase bias in the in-phase component and the quadrature component of the phase error; and
    the phase detector is configured to detect the combined phase error and phase bias based on the combined in-phase component and the combined quadrature component.

* * * * *